(12) United States Patent
Kim (10) Patent No.: US 12,077,457 B2
(45) Date of Patent: Sep. 3, 2024

(54) REMEDIATION METHOD AND SYSTEM FOR DEEP-SEA MINE TAILINGS

(71) Applicant: Korea Institute of Ocean Science & Technology, Busan (KR)

(72) Inventor: Kyoungrean Kim, Busan (KR)

(73) Assignee: KOREA INSTITUTE OF OCEAN SCIENCE & TECHNOLOGY, Busan (KR)

( * ) Notice: Subject to any disclaimer, the term of this patent is extended or adjusted under 35 U.S.C. 154(b) by 157 days.

(21) Appl. No.: 17/221,681

(22) Filed: Apr. 2, 2021

(65) Prior Publication Data

US 2021/0323841 A1    Oct. 21, 2021

(30) Foreign Application Priority Data

Apr. 21, 2020 (KR) .................. 10-2020-0048065

(51) Int. Cl.
*C02F 1/42* (2023.01)
*B01D 63/06* (2006.01)
(Continued)

(52) U.S. Cl.
CPC ............. *C02F 1/42* (2013.01); *B01D 63/06* (2013.01); *B01D 65/02* (2013.01); *B01D 69/04* (2013.01); *C02F 1/44* (2013.01); *C02F 1/5245* (2013.01); *B01D 2313/201* (2022.08); *B01D 2315/02* (2013.01); *B01D 2319/04* (2013.01); *C02F 2101/20* (2013.01); *C02F 2103/10* (2013.01); *C02F 2303/16* (2013.01)

(58) Field of Classification Search
CPC ............ C02F 1/42; C02F 1/44; C02F 1/5245; C02F 2101/20; C02F 2103/10; C02F 2303/16; C02F 11/004; C02F 1/5236; C02F 1/26; C02F 1/62; B01D 63/06; B01D 65/02; B01D 69/04; B01D 2313/20; B01D 2315/02; B01D 2319/04; B01D 63/04; B01D 2315/06; B01D 2313/201; B01D 63/16; B01D 65/08; B01D 69/02; B01D 2321/2016; B01D 2325/42; B01D 63/02
USPC ........................................................ 210/638
See application file for complete search history.

(56) References Cited

U.S. PATENT DOCUMENTS

| 5,989,419 A | * | 11/1999 | Dudley | .................. | B01D 41/04 |
| | | | | | 134/152 |
| 2009/0127117 A1 | * | 5/2009 | Miura | .................... | B01D 61/48 |
| | | | | | 204/632 |
| 2012/0296147 A1 | * | 11/2012 | Swearingen | .............. | C02F 9/00 |
| | | | | | 588/318 |

(Continued)

FOREIGN PATENT DOCUMENTS

| EP | 2708514 A1 | * | 3/2014 | .............. | B01J 47/04 |
| EP | 3138618 A1 | * | 3/2017 | ......... | B01D 21/0072 |

(Continued)

OTHER PUBLICATIONS

Apec Water, Different Water Filtration Methods Explained, Jul. 9, 2017, pp. 1-3 (Year: 2017).*

(Continued)

*Primary Examiner* — Hayden Brewster (57) ABSTRACT

A system for remedying deep-sea mine tailings includes a reaction basin in which the solid-liquid ratio of deep-sea mine tailings is adjusted and into which aluminum sulfate is injected as an additive for extraction of heavy metals from the deep-sea mine tailings.

7 Claims, 9 Drawing Sheets

(51) Int. Cl.
  *B01D 65/02* (2006.01)
  *B01D 69/04* (2006.01)
  *C02F 1/44* (2023.01)
  *C02F 1/52* (2023.01)
  *C02F 101/20* (2006.01)
  *C02F 103/10* (2006.01)

(56) References Cited

U.S. PATENT DOCUMENTS

2014/0174998 A1* 6/2014 Aerts ............... B01D 63/04
                                                    210/151
2017/0120196 A1* 5/2017 Tanaka ............ B01D 63/04

FOREIGN PATENT DOCUMENTS

| KR | 20070017960 A | * | 2/2007 | |
| KR | 20100113236 A | * | 10/2010 | ........... B09B 3/0033 |
| KR | 101496112 B1 | * | 2/2015 | ............. C02F 11/14 |
| KR | 10-1590037 B1 | | 1/2016 | |
| WO | WO-2017143441 A1 | * | 8/2017 | ........... B09B 3/0033 |
| WO | WO-2020018397 A1 | * | 1/2020 | ............ C02F 1/5245 |

OTHER PUBLICATIONS

Machine Translation of Kim KR101590037B1 (IDS) (Year: 2016).*
Machine Translation of Kim 2 KR20100113236A (Year: 2010).*
Machine Translation of Park KR101496112B1 (Year: 2015).*
Windsor, Backflow Prevention, Aug. 16, 2014 (Year: 2014).*
HDR Engineering, Water Reuse Technology Demonstration Project, Jun. 2002 (Year: 2002).*
Lindgren, Pretreatment Processes for Potable Water Treatment Plants, pp. 4-73, May 2014, (Year: 2014).*
Masanori, KR20070017960 A, English machine translation (Year: 2007).*

* cited by examiner

REMEDIATION METHOD AND SYSTEM FOR DEEP-SEA MINE TAILINGS

CROSS REFERENCE TO RELATED APPLICATION

The present application claims priority under 35 U.S.C. 119(a) to Korean Patent Application No. 10-2020-0048065, filed 21 Apr. 2020, the entire contents of which is incorporated herein for all purposes by this reference.

BACKGROUND

1. Field of the Invention

The present invention relates to a system and method for remedying deep-sea mining wastes by extracting heavy metals from the deep-sea mining wastes and by dewatering and stabilizing residual solids.

2. Description of the Related Art

The self-sufficiency ratio of metal or minerals in Korea is only 0.4%. In particular, as economic activity increases, the depletion of domestic and foreign terrestrial mineral resources is intensifying, and the demand for exploitation of marine mineral resources such as deep-sea mineral resources is increasing. Globally, competition for sea area surveys, exploration rights, and development rights is intensifying. Korea obtained exclusive exploration rights in five mining lots (sea areas including the Pacific and Indian Oceans, a total area of 15,000 $km^2$ which is 1.16 times the total area of the southern part of the Korean Peninsula) for several years from 1994 to 2020.

In addition, as the economic exploitation of deep-sea mines by major multinational companies (for example, Lockheed Martin, Nautilus Minerals, etc.) has become feasible, international organizations has established environmental standards for deep-sea mining.

In general, the areas for exploiting deep-sea mineral resources are the high seas. Therefore, a remediation treatment method and system that comply to the international environmental standards are indispensable.

Remediation required in the exploitation of deep-sea mineral resources involves a series of processes including collection of ore that exists in the deep seabed of far sea areas such as the Pacific and Indian Oceans, lifting the ore to a mining vessel on the sea, and ore dressing of selectively recovering only useful minerals from the ore on the mining vessel, on-site remediation of tailings which are slurry composed of fine solids having sizes of several to hundred micrometers and wastes liquids to reduce negative impact on environment, and disposal of residues.

As techniques directly or indirectly related to the remediation of deep-sea mine tailings, soil and sediment remediation techniques used onshore mines are used as they are. However, since these techniques are land-based technologies, a single remediation treatment system is composed of multiple treatment units and requires tap water, electricity, and infrastructure. In addition, a large space is required for installation and operation of equipment for physical particle separation or chemical cleaning because the equipment has a large footprint. For example, a single water treatment plant includes four settling basins, each usually having a diameter of 50 m.

However, since sea areas are limited in available infrastructure and space unlike land areas, land-based technologies cannot be applied in sea areas as they are. In order to remedy deep-sea mine tailings in a sea area, vibration-resistant and corrosion-resistant treatment devices are required to overcome the effects of sea conditions such as waves and chlorine ions. In addition, since a sea area is an ecological system in which many marine organism and creatures live, a remediation treatment system needs to be configured to suitably treat the deep-sea mine tailings to reduce marine pollution.

SUMMARY

An objective of the present disclosure is to provide a system and method for effectively remedying deep-sea mine tailings in an offshore area or in a mining vessel.

In order to accomplish the objective of the present disclosure, one aspect of the present disclosure provides a "remediation system for deep-sea mine tailings" (hereinafter, simply referred to as "system"), the system including: a reaction basin in which a solid-liquid ratio of deep-sea mine tailings is adjusted and into which aluminum sulfate is injected for extraction of heavy metals from the deep-sea mine tailings; and a filtration apparatus into which fluid containing the extracted heavy metals is introduced from the reaction basin, in which the extracted heavy metals contained in the fluid are filtered out by a cylindrical ion exchange membrane having a central hole, from which filtrate is discharged through the central hole of the ion exchange membrane, and in which residual solids are settled down.

In an embodiment, the filtration apparatus may include: a housing having an internal space; an ion exchange membrane module removably installed in the housing and composed of multiple ion exchange membranes; and a conditioning unit connected to a lower end of the housing, configured to receive the residual solids settled down in the housing, and configured to perform conditioning of the residual solids.

In an embodiment, the ion exchange membrane module may include: the multiple ion exchange membranes; and a frame having multiple installation portions in which the respective ion exchange membranes are installed and each of which has an open upper end, and a collection portion disposed on the ion installation portions, configured to communicate with the central hole of each of the ion exchange membranes, and configured to collect the treated water discharged from the central hole of each of the ion exchange membranes.

In an embodiment, the ion exchange membrane module may be equipped with a washing water ejector that ejects washing water to the ion exchange membranes, and the ion exchange membranes may be rotatably installed in the respective installation portions.

In an embodiment, oblique protrusions that are inclined in the same direction may be provided on an external circumferential surface of each of the ion exchange membranes, to enable the ion exchange membranes to be rotated by a fluid pressure.

In an embodiment, the conditioning unit may include: a second housing having a cylinder shape and including an additive injection hole at a first portion, an inflow pipe connected to a lower surface of the housing, and a conditioned solid discharge hole at a second portion; and a screw rotatably installed in the second housing.

In an embodiment, the inflow pipe may be provided with one or more closable openings that are closed by doors pivoted only downward.

Another aspect of the present disclosure provides a "remediation method of deep-sea mine tailings" (hereinafter, simply referred to as "method"), the method including: a solid-liquid ratio adjustment step in which deep-sea mine tailings are mixed with water to adjust a solid-liquid ratio; a heavy metal extraction step in which aluminum sulfate is added to the mixture to extract heavy metals from the deep-sea mine tailings; and a filtration step in which the extracted heavy metals are filtered out.

In an embodiment, the method may further include a solid conditioning step in which residual solids are conditioned.

In an embodiment, the filtration step may be performed such that the extracted heavy metals are filtered out by an ion exchange membrane having a central hole and filtrate is discharged through the central hole of the ion exchange membrane.

According to the present disclosure, heavy metals are extracted from deep-sea mine tailings and filtered out. In addition, residual solids are conditioned during the filtration. Therefore, the present disclosure can be easily applied in an onshore or ocean mining vessel.

BRIEF DESCRIPTION OF THE DRAWINGS

The above and other objectives, features, and other advantages of the present disclosure will be more clearly understood from the following detailed description taken in conjunction with the accompanying drawings, in which.

DESCRIPTION

Hereinafter, the configuration and operation of the present disclosure will be described in detail with reference to accompanying drawings. In describing the present disclosure, terms or words used in the specification and claims must be interpreted as meanings consistent with the technical idea of the present disclosure on the basis of the principle that the inventor can appropriately define the terms to describe his or her invention in the best way.

Figure 1:
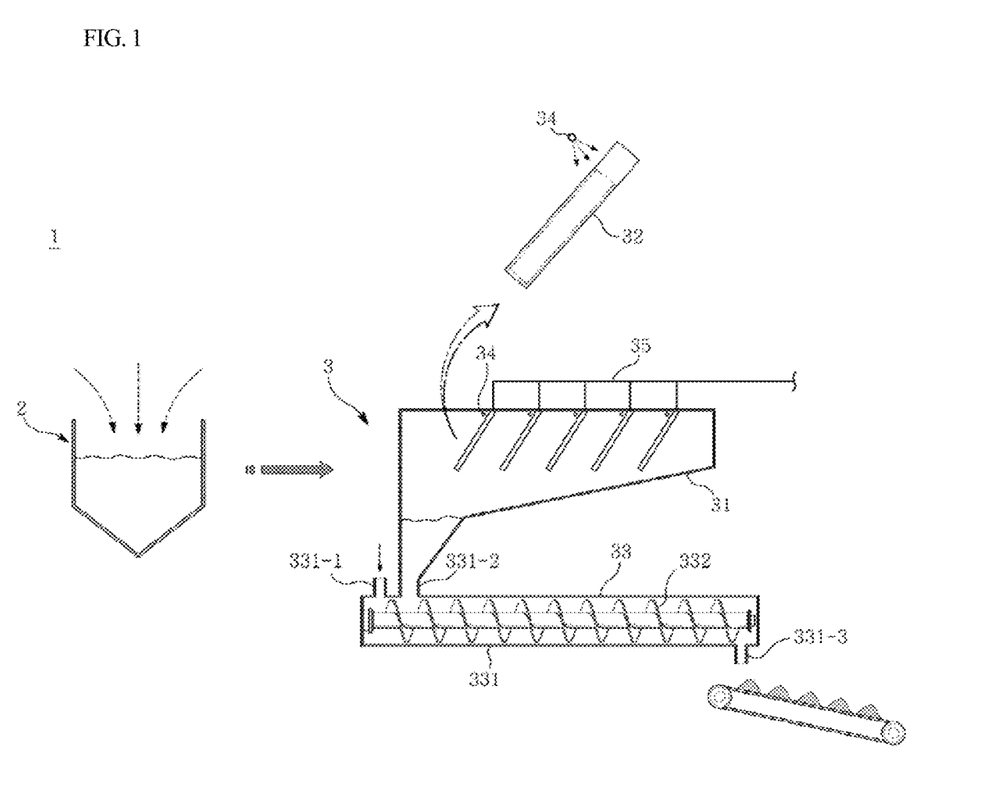
FIG. 1 is a schematic view of a remediation treatment system according to an embodiment of the present disclosure.
Figure 2:
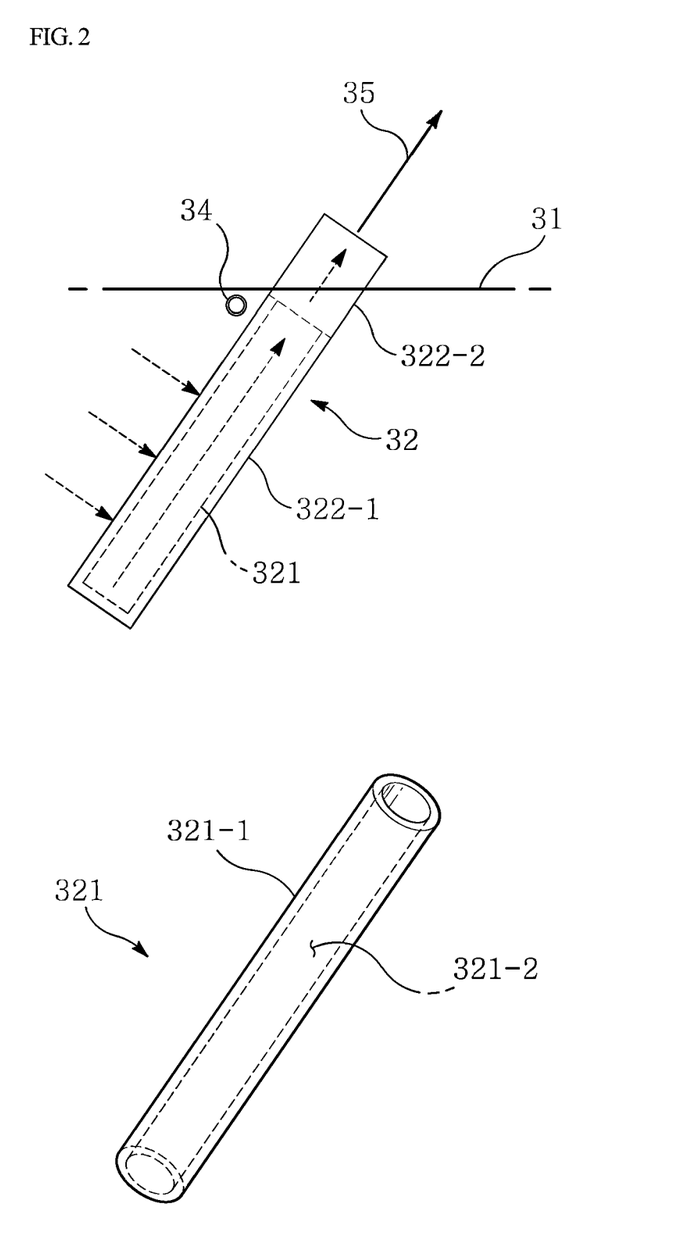
FIG. 2 is a view illustrating an ion exchange membrane module that is one component of the remediation treatment system according to an embodiment of the present disclosure.
Figure 3:
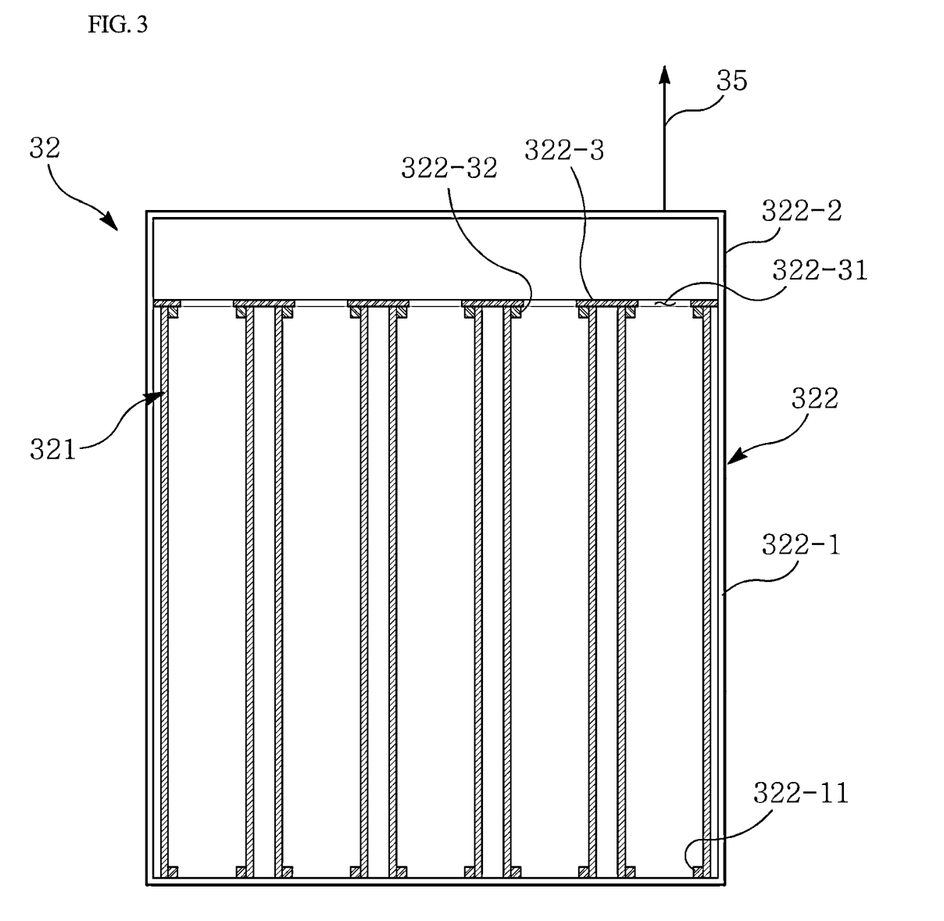
FIG. 3 is a cross-sectional view of the ion exchange membrane module illustrated in FIG. 2.

Referring to FIGS. 1, 2 and 3, according to an embodiment of the present disclosure, a deep-sea mine tailings remediation treatment system 1 includes a reaction basin 2 and a filtration apparatus 3. The reaction basin 2 contains a mixture of water and deep-sea mine tailings. In the basin 2, a solid-liquid ratio, which is a ratio of the water and the mine tailings, is adjusted, and aluminum sulfate is added to the mixture to extract heavy metals from the mine tailings. Fluid containing fine solids and the extracted heavy metals is sent to the filtration apparatus 3 from the reaction basin 2. The fluid is filtered by an ion exchange membrane 321 in the filtration apparatus 3 so that the heavy metals are removed from the fluid. In addition, the resulting filtrate from which the heavy metals are removed is discharged to the outside of the filtration apparatus 3 through a hole 321-2, and the solids are settled down in the filtration apparatus 3.

In the reaction basin 2, deep-sea mine tailings and water are mixed and the solid-liquid ratio thereof is adjusted. In addition, aluminum sulfide is added to the mixture in the reaction basin 2 so that heavy metals are extracted from the deep-sea mine tailings. Although only one reaction basin 2 is illustrated in the drawings, the number of reaction basins included in the system is not limited to one. Alternatively, there may be two reaction basins serving as a mixing basin and a chemical treatment basin, respectively.

In the reaction basin 2, after the slurry state of the deep-sea mine tailings are mixed uniformly and the solid-liquid ratio thereof is adjusted (through initial one-time addition or flow rate adjustment), an appropriate concentration of aluminum sulfate is injected, and mixing is performed for a predetermined period of time for perfect blending. Thus, chemical cleaning is performed. During this chemical cleaning process, heavy metals such as copper are extracted from wastes (i.e., mine tailings) to be remediated. As a result, a predetermined amount of fluid containing cations of the extracted heavy metals is generated.

The solid-liquid ratio is preferably adjusted to be in a range of 1:3 to 1:6 in terms of weight.

Aluminum sulfate has been used as a coagulating agent that is commonly used for water remediation or wastes water or sewage treatment. In connection with this matter, the inventor of the present patent application has found that the amount of extracted heavy metals such as copper, zinc, nickel, and cadmium that are main components contained in manganese nodules depend on the concentration of an additive and a reaction time in a chemical treatment process in which aluminum sulfate is used as the additive. The chemical treatment process is performed for research and development for technologies for remediation of soil and treatment of deposits including deep-sea mine tailings.

Looking at the mechanism of action of aluminum sulfate, when aluminum sulfate is introduced into water, aluminum sulfate is dissociated into trivalent aluminum cations and divalent sulfate anions. That is, cations of hazardous heavy metals such as copper are generated from heavy metal-containing media such as deposits, soils, and manganese nodules through ion exchange reactions. Considering the total number of electrons ($-6e^-$) of sulfate anions, not only divalent metal cations (for example, $3M^{+2}$) but also trivalent metal cations (for example, $2M^{+3}$) can also be reacted on the basis of stoichiometry.

$$Al_2(SO_4)_3 \rightarrow 2Al^{+3} + 3(SO_4)^{-2}$$

That is, it was found that aluminum sulfate can be used newly as an additive in chemical treatment for heavy metal extraction as well as a typical coagulating agent through a test described below.

Figure 6:
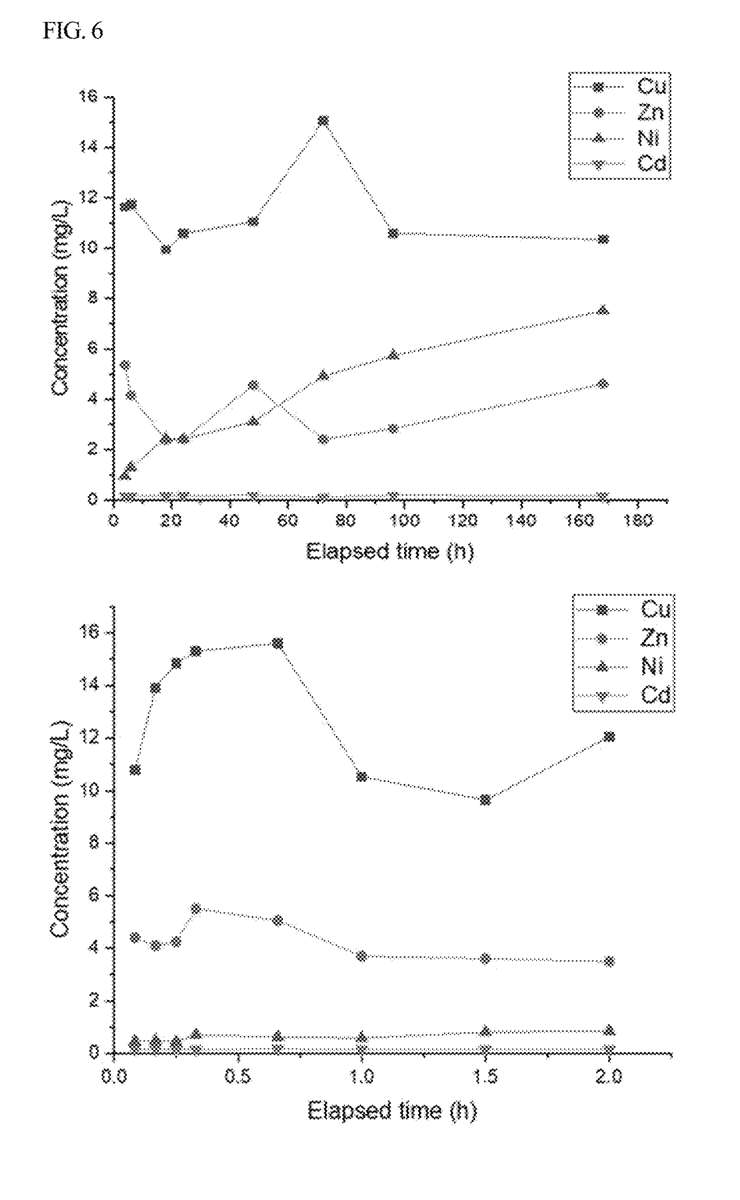
FIG. 6 is a graph illustrating changes in concentrations of heavy metals that are extracted from a manganese nodule according to reaction time when 1% aluminum sulfate is added.
Figure 7:
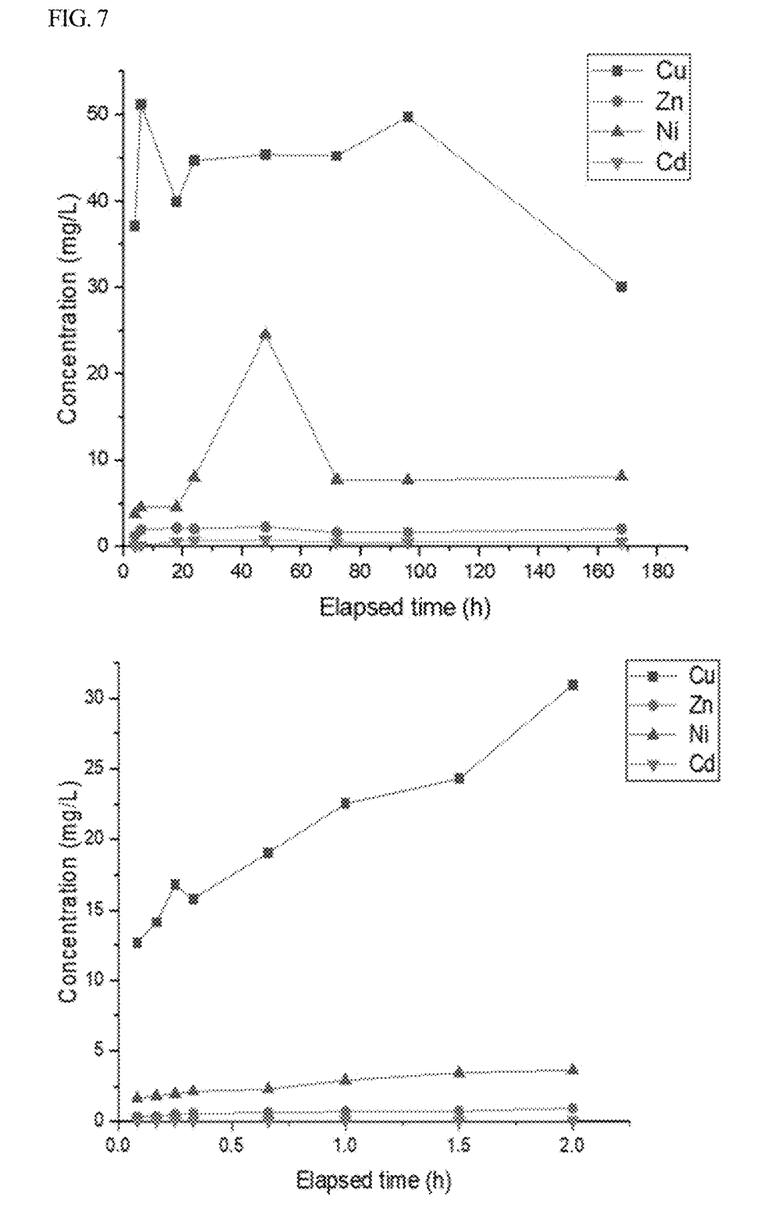
FIG. 7 is a graph illustrating changes in concentrations of heavy metals that are extracted from a manganese nodule according to reaction time when an existing common extraction agent (EDTA 0.1 M) is used.

FIGS. 6 and 7 illustrate the results of chemical treatment in a case where aluminum sulfate was used as an additive newly and a case where ethylene diamine tetra acetic acid (EDTA) that is a typical extraction agent was used are compared.

When aluminum sulfate was added in a concentration of 1%, the amounts of heavy metals such as copper, zinc, nickel, and cadmium extracted from a manganese nodule sample (particle size of 32 to 63 µm) was respectively 0.4 times, 2.2 times, 0.36 times, and 0.69 times the amount of heavy metal extracted when EDTA was used in a concentration of 0.1 M. That is, the amounts of the extracted heavy metals insignificantly changed. This means that aluminum sulfate can be used as a heavy metal extraction agent.

Figure 8:
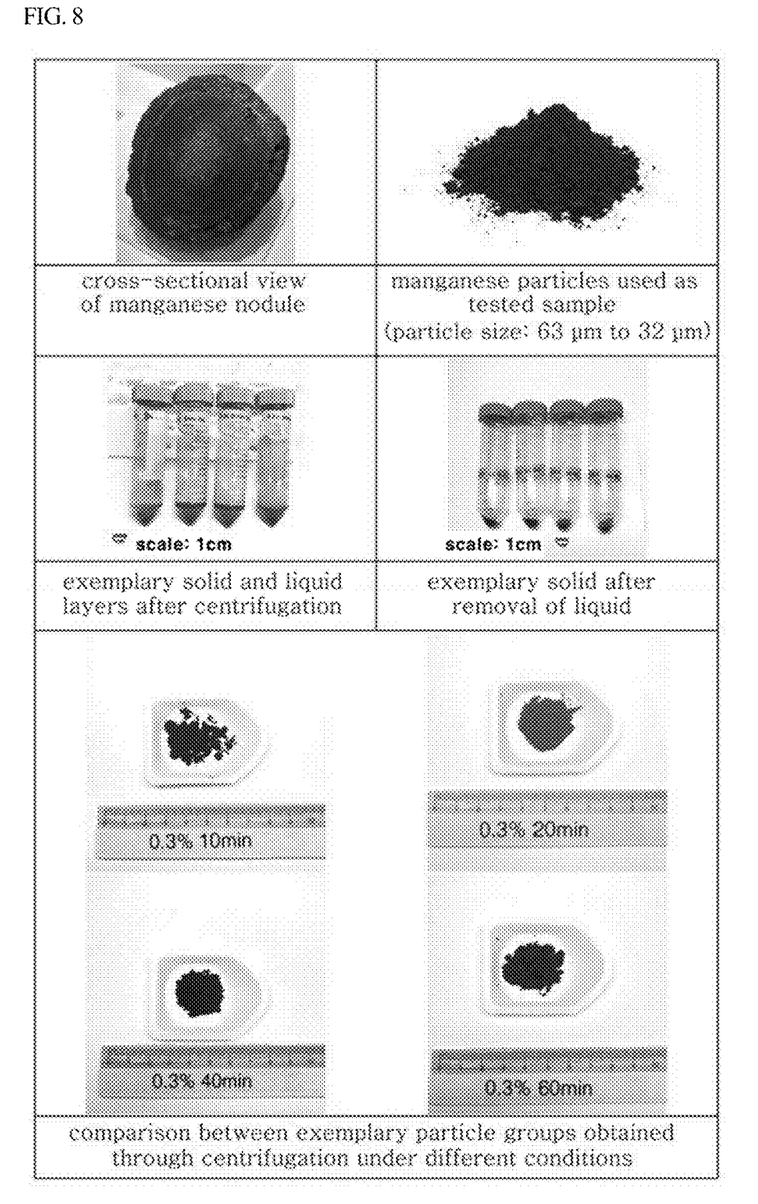
FIG. 8 is a photograph illustrating change in size of solids separated through centrifugation after a sample is treated under various conditions.

In addition, aluminum sulfate coagulates substances-to-be removed in a chemical treatment process, thereby increasing the filtration efficiency in the next stage Referring to FIG. 8, in the case of coagulation of objects to be removed in a chemical treatment process using aluminum sulfate as an additive for treatment of a manganese nodule sample, the size of flock resulting from coagulation of the objects to be removed increases with a treatment time. This means that when the filtration, which is performed after the extraction of heavy metals, is performed using the ion exchange membranes, the filtration efficiency increases.

The filtration apparatus 2 includes a housing 31 having an internal space, an ion exchange membrane module 32 that is removably installed in the housing 31 and which is composed of a plurality of ion exchange membranes 321, a conditioning unit 33 that is connected to the bottom of the housing 31 to collect the solids (sludge) settled in the housing 31 and to perform conditioning of the solids.

A feed pipe is connected to one side of the housing 31 so that the fluid containing the extracted heavy metals is introduced into the housing 31 through the inflow pipe. The housing 31 has a sealed structure. Although not illustrated in the drawings, the housing 31 is provided with a predetermined number of installation holes through which the ion exchange membrane modules 32 are respectively installed in the housing 31. Therefore, the number of the installation holes is equal to the number of the ion exchange membrane modules 32 to be installed. The filtration apparatus is configured such that the filtrate is discharged to the outside of the filtration apparatus only through the ion exchange membranes 32. The process in which the ion exchange membrane modules 32 are installed and removed through the installation holes is a known technique, a detailed description thereabout will be omitted.

The filtrate passing through the ion exchange membrane modules 32 may be returned to the reaction basin 2 for adjustment of the solid-liquid ratio.

Referring to FIGS. 2 and 3, each of the ion exchange membrane modules 32 includes multiple ion exchange membranes 321 and a frame 322. The frame 322 has multiple installation portions 322-1 that are open at their upper end and in which the multiple ion exchange membranes 321 are installed. The frame 322 also has a collection portion 322-2 provided on the installation portions 322-1 and configured to communicate with the hole of each of the multiple ion exchange membranes 321. Fluid passes through the hole of each of the ion exchange membranes 321 and collects in the collection portion 322-2.

Referring to FIG. 2, the ion exchange membrane 321 has a cylindrical body 321-1 and a central hole 321-2. The ion exchange membrane 321 is made of a material that does not allow only cations contained in fluid. Since such a material is well known in the art, a detailed description of the material will be omitted. Fluid is fed from one side of the ion exchange membrane 321. Cations of heavy metals and solids are blocked by the ion exchange membrane 321 and the other components pass through the ion exchange membrane 321. The filtrate from which solids and heavy metals are removed flows upward through the central hole 321-1 of the ion exchange membrane and is then discharged outside.

During this filtration process, residual solids may be deposited on the outer surface of the ion exchange membrane 321. Therefore, the remediation treatment system according to the present disclosure may further include a washing water ejector 34 that ejects washing water to the surface of the ion exchange membranes 321 of the ion exchange membrane module 32 to remove the deposited residual solids.

The washing water ejector 34 is preferably structured to eject washing water to the upper end of the ion exchange membrane module 32 in the housing 31. Since the washing water ejector 34 is a common component in the related art, a detailed description of the structure of the washing water ejector 34 will be omitted.

The frame 322 is composed of the installation portion 322 and the collection portion 322-2. The installation portion 322-1 has an open upper end and contains multiple ion exchange membranes 321. The upper end of the installation portion 322-1 is open, and the flank of the installation portion has a mesh shape so that fluid can pass through the upper end and the side of the installation portion 322-1. On the other hand, the lower end of the installation portion 322-1, which is in contact with the lower end of the ion exchange membrane 321, is closed. Therefore, the fluid is prevented from being introduced into the ion exchange membrane 321 through the lower end of the installation portion.

A partition wall 322-3 is disposed between the collection portion 322-2 and the installation portion 322-1. The collection portion 322-2 is disposed on the installation portion 322-1 and is configured to communicate with the central hole of the ion exchange membrane 321. The treated water discharged from the upper end of each ion exchange membrane 321 is collected in the collection portion 322-2. A discharge pipe 35 is connected to the collection portion 322-2 so that the treated water is discharged from the collection portion 322-2 through the discharge pipe 35. The central holes of the respective ion exchange membranes 321 are aligned with respective through holes 322-31 of the partition wall 322-3 so as to communicate with the collection portion 322-2.

Preferably, each of the ion exchange membranes 321 is rotatably installed in the frame 322. The rotation of the ion exchange membranes 321 prevents the pores of the ion exchange membranes 321 from clogging and enables the entire surface of each ion exchange membrane 321 to be washed when the washing water ejector 34 ejects washing water. To this end, the remediation treatment system may further include an electric driving unit that rotates the ion exchange membranes 321. Alternatively, the ion exchange membranes 321 may be rotated without supply of external electric energy.

Referring to FIG. 3, in one embodiment of the present disclosure, in order to rotate each ion exchange membrane 321, the upper end of each ion exchange membrane 321 is fastened by a fastening member 322-32 engaged with the partition wall 322-3 and the lower end of each ion exchange membrane 321 is fastened by a fastening member 322-11 provided at the lower end of a corresponding one of the installation portions 322-1.

Figure 4:
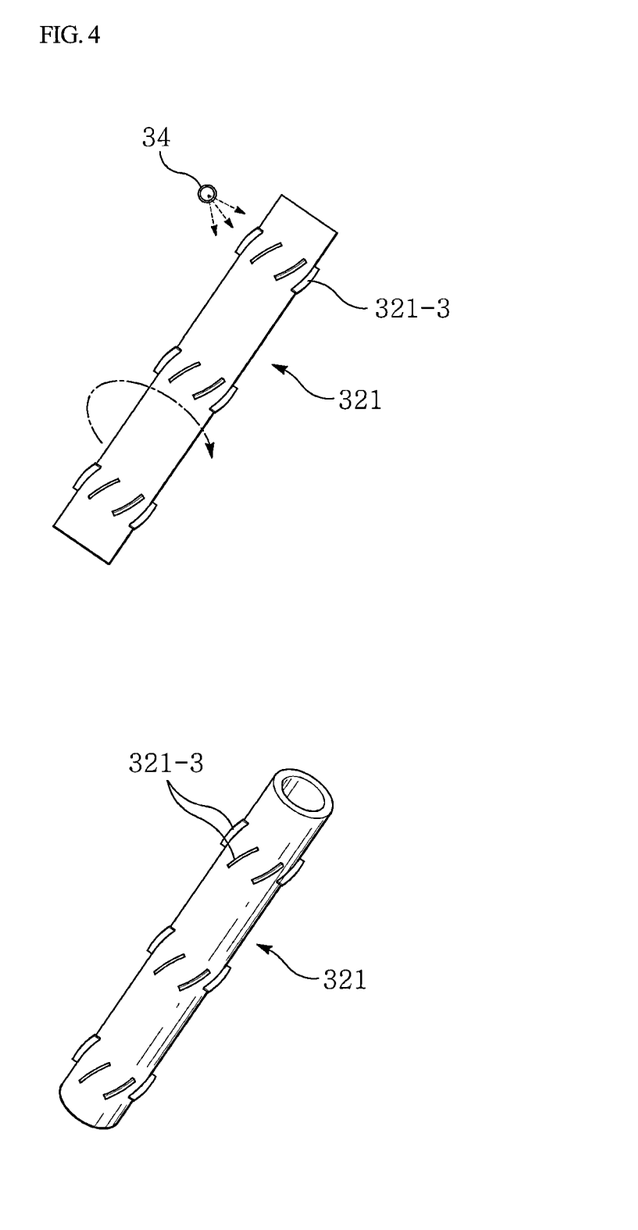
FIG. 4 is a perspective view of an image ion exchange membrane of the remediation treatment system according to an embodiment of the present disclosure.

In addition, as illustrated in FIG. 4, oblique protrusions 321-3 that are inclined in the same direction are provided on the outer circumferential surface of each ion exchange membrane 321. Thus, the ion exchange membranes 321 can be rotated by the pressure of the fluid. Specifically, the washing water ejected by the washing water ejector 34 can rotate the ion exchange membranes 321 by striking the protrusions 321-3. With this operation, the outer surface of each ion exchange membrane 321 can be uniformly washed.

Residual solids resulting from the actions of settling or filtration are introduced into the conditioning unit 33 provided under the housing 31. The conditioning unit 33 conditions the residual solids. The conditioning means a process of solidifying the residual solids such that the residual solids can be easily carried or a process of adjusting the property or state of the solids such that the residual solids have predetermined strength and are not hazardous to the environment.

Referring to FIG. 1, the conditioning unit 33 includes a second housing 331 and a screw 332. The second housing 331 has a cylindrical shape, an additive injection hole 331-1, an inflow pipe 331-2 connected to the lower end of the housing 31, and a discharge hole 331-3 through which the residual solids that have undergone conditioning are discharged. The screw 332 is rotatably installed in the second housing 331.

As the additive to be injected through the additive injection hole 331-1, various existing additives can be used. The additive is a solidifying agent mainly containing blast furnace slag powder that is rich in $SiO_2$ or $Al_2O_3$, calciumsulfoaluminate, magnesium oxide, etc.

Figure 5:
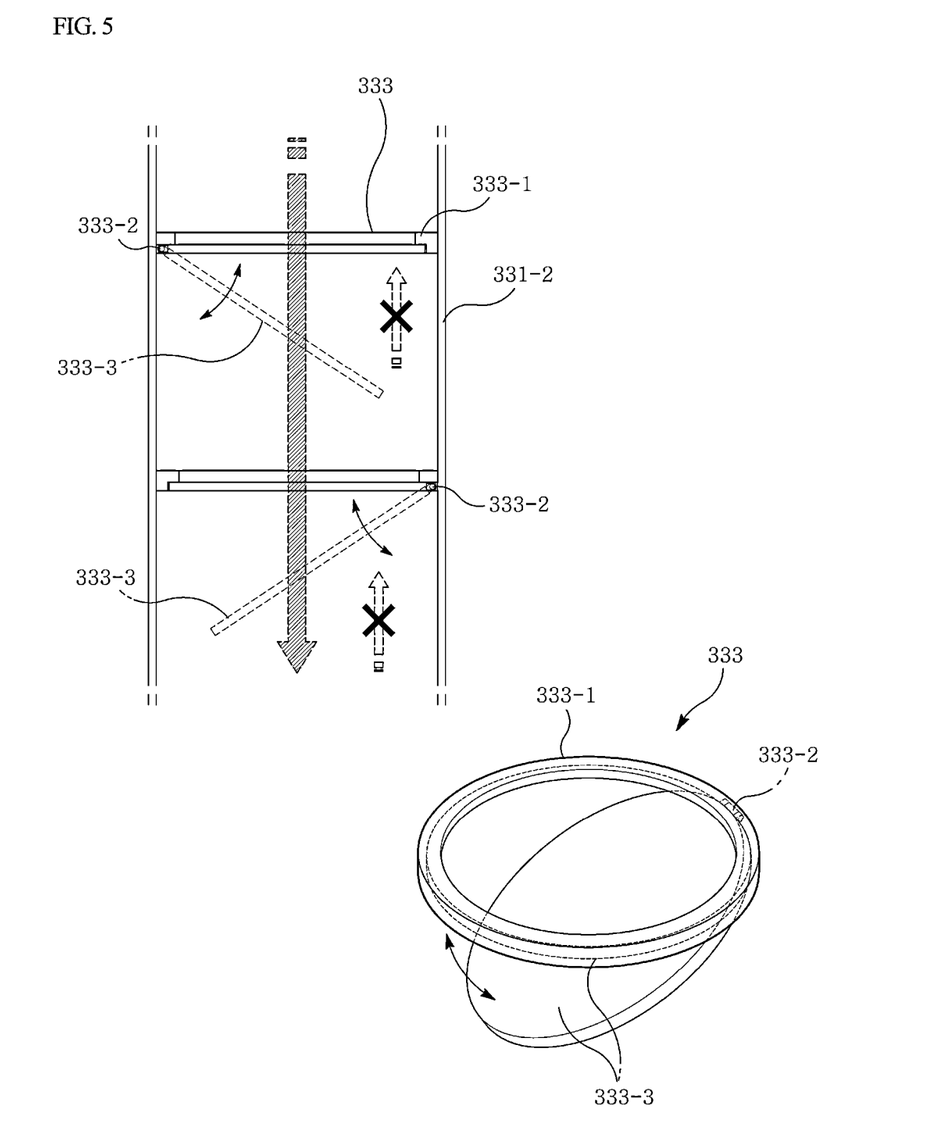
FIG. 5 is a schematic view illustrating one component of the remediation treatment system according to a modification to an embodiment of the present disclosure.

Referring to FIG. 5, the inflow pipe 331-2 is provided with one or more closable openings 333 that can be closed by doors which are coupled in a hinged manner and pivoted only downward. This structure prevents the residual solids from back-flowing when the residual solids are dehydrated by the operation of the screw 332. The closable opening 333 includes an installation ring 333-1 and a door 333-3 coupled to the installation ring 333-1 by a hinge member. The door 333-3 is configured to be pivoted only downward, thereby preventing the backflow.

Although not illustrated in the drawings, the hinge member 333-2 may be of a spring type. In this case, the opening is normally closed by the door due to a restoration force when there is no external force. On the other hand, the door is opened when residual solids move downward.

Figure 9:
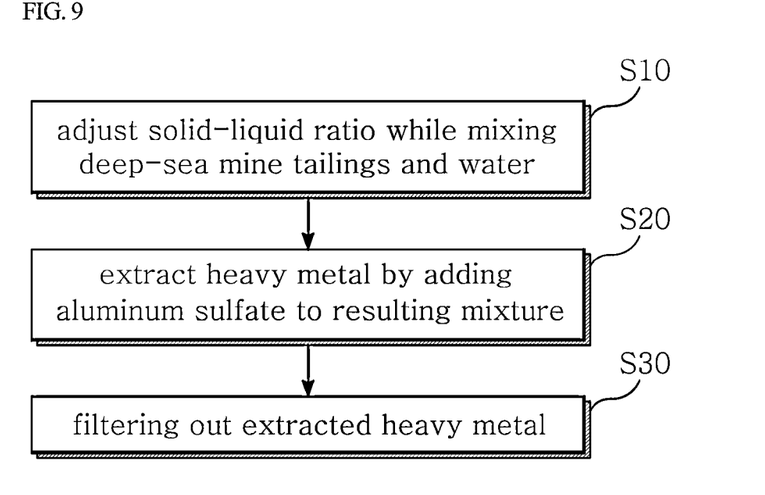
FIG. 9 is a block diagram illustrating a remediation treatment method according to an embodiment of the present disclosure.

Referring to FIG. 9, a method of remedying deep-sea mine tailings, according to an embodiment of the present disclosure includes: a solid-liquid ratio adjusting step S10 in which deep-sea mine tailings are mixed with water for adjustment of a solid-liquid ratio; a heavy metal extraction step S20 in which aluminum sulfate is added to the mixture to extract heavy metals from the deep-sea mine tailings; and a filtration step S30 in which the extracted heavy metals are filtered out.

The solid-liquid ratio adjustment step S10 and the heavy metal extraction step S20 are performed in the reaction basin 2.

The subsequent filtration step S30 is performed with the ion exchange module membrane 32 described above. Since the filtration mechanism and the structure of the ion exchange membrane module 32 are described in detail above, a redundant description will be omitted here.

Next, a conditioning step S40 (not illustrated in FIG. 9) in which residual solids are conditioned is performed. The conditioning step S40 is performed in the conditioning unit 33. Since the operation of the conditioning unit 33 is described above, a redundant description will be omitted here.

The ordinarily skilled in the art will appreciate that the embodiments described above may be diversely changed, altered, or modified without departing from the technical spirit of the present disclosure. Therefore, it should be understood that the scope of the present disclosure is not limited to the detailed description of the exemplary embodiments and but is determined as defined in the claims.

What is claimed is:
1. A system for treating deep-sea mine tailings, the system comprising:
a reaction basin in which a solid-liquid ratio of deep-sea mine tailings is adjusted and into which aluminum sulfate is injected for extraction of heavy metals from the deep-sea mine tailings, wherein the solid-liquid ratio is in a range from 1:3 to 1:6 in terms of weight,
a filtration apparatus including a housing having an internal space and a predetermined number of installation holes for a plurality of ion exchange membrane modules removably installed in the housing, and
a conditioning unit connected to a lower end of the housing, configured to receive residual solids settled down in the housing, and configured to perform conditioning of the residual solids to solidify the residual solids such that residual solids can be easily carried or to produce residual solids with predetermined strength and that are not hazardous to an environment,
wherein each ion exchange membrane module of the plurality of ion exchange membrane modules consists of
a rectangular frame consisting of
a rectangular installation portion with an upper end and a closed lower end
a rectangular collection portion with an upper end and a lower end that is configured with a plurality of openings; and
a partition wall disposed between the rectangular installation portion and the rectangular collection portion, and
a plurality of cylindrical ion exchange membranes having central holes that are arranged within the rectangular installation portion in parallel, each extending from direct contact with the lower end of the rectangular installation portion upward to directly contact the partition wall, and the central holes respectively in communication with the plurality of openings of the rectangular collection portion, wherein the plurality of cylindrical ion exchange membranes are made of a material that blocks cations of heavy metals contained in fluid,
wherein the rectangular frame includes a mesh on a flank side so that fluid containing the extracted heavy metals can pass through the mesh,
wherein an upper end of each of the plurality of cylindrical ion exchange membranes is fastened to a respective partition wall common to the lower end of the rectangular collection portion and a lower end is fastened to the lower end of the rectangular installation portion to allow free rotation of the plurality of cylindrical ion exchange membranes within the rectangular installation portion, and wherein the fluid containing the extracted heavy metals passes from the reaction basin through the mesh and is filtered by the plurality of cylindrical ion exchange membranes to be collected in the rectangular collection portion as treated water, wherein a discharge pipe connected to the rectangular collection portion discharges the treated water, wherein each ion exchange membrane module of the plurality of ion exchange membrane modules includes an electric driving unit that rotates each plurality of cylindrical ion exchange membranes, wherein the conditioning unit comprises a second housing having a cylindrical shape and including an additive injection hole for a solidifying agent at a first portion, an inflow pipe connected to a lower surface of the housing, a conditioned solid discharge hole at a second portion; and a screw rotatably installed in the second housing.

2. The system according to claim 1, wherein the fluid containing the extracted heavy metals cannot pass through the lower ends each of the plurality of cylindrical ion exchange membranes.

3. The system according to claim 1, wherein the filtration apparatus comprises the plurality of ion exchange membrane modules with upper ends of the rectangular collection portions installed in parallel on a surface of the housing and with free lower ends in the internal space, and wherein the upper ends of the rectangular collection portions to the free lower ends form an oblique angle to the surface of the housing.

4. The system according to claim 3, wherein each ion exchange membrane module of the plurality of ion exchange membrane modules includes a washing water ejector that ejects washing water onto each plurality of ion exchange membranes.

5. The system according to claim 4, wherein each of the plurality of cylindrical ion exchange membranes includes an external circumferential surface with oblique protrusions that are inclined in the same direction to enable the plurality of cylindrical ion exchange membranes to be rotated by a fluid pressure within the plurality of rectangular installation portions.

6. The system according to claim 1, wherein the inflow pipe is provided with one or more closable openings that are closed by doors pivoted only downward.

7. A method of remedying deep-sea mine tailings, the method comprising the steps of:

adjusting a solid-liquid ratio of deep-sea mine tailings by mixing the deep-sea mine tailings with water in a reaction basin, wherein the solid-liquid ratio is in a range from 1:3 to 1:6 in terms of weight;

adding aluminum sulfate to the adjusted deep-sea mine tailings to extract heavy metals;

sending fluid containing solids and the extracted heavy metals to a filtration apparatus including a housing having an internal space and a predetermined number of installation holes for a plurality of ion exchange membrane modules removably installed in the housing;

conditioning remaining solids to solidify the remaining solids such that the remaining solids can be easily carried or to produce the remaining solids with predetermined strength and that are not hazardous to an environment by a conditioning unit, wherein each ion exchange membrane module of the plurality of the ion exchange membrane modules consists of a rectangular frame consisting of a rectangular installation portion with an upper end and a closed lower end;

a rectangular collection portion with an upper end and a lower end that is configured with a plurality of; and a partition wall disposed between the rectangular installation portion and the rectangular collection portion, and a plurality of cylindrical ion exchange membranes having central holes that are arranged within the rectangular frame in parallel, each extending from direct contact with the lower end of the rectangular frame upward to directly contact a partition wall disposed between the lower end of the rectangular collection portion and the plurality of cylindrical ion exchange membranes, and the central holes respectively in communication with the plurality of openings of the rectangular collection portion, wherein the plurality of cylindrical ion exchange membranes are made of a material that blocks cations of heavy metals contained in fluid, wherein the rectangular frame includes a mesh on a flank side so that fluid containing the extracted heavy metals can pass through the mesh, and wherein an upper end of each of the plurality of cylindrical ion exchange membranes is fastened to a respective partition wall common to the lower end of the rectangular collection portion and a lower end is fastened to the lower end of the rectangular frame to allow free rotation of the plurality of cylindrical ion exchange membranes;

passing the fluid containing the extracted heavy metals from the reaction basin through the mesh;

filtering the fluid containing the extracted heavy metals through the plurality of cylindrical ion exchange membranes; and collecting treated water in the rectangular collection portion, wherein a discharge pipe connected to the rectangular collection portion discharges the treated water, wherein each ion exchange membrane module of the plurality of ion exchange membrane modules includes an electric driving unit that rotates each cylindrical ion exchange membranes, wherein the conditioning unit comprises a second housing having a cylinder shape and including an additive injection hole for a solidifying agent at a first portion, an inflow pipe connected to a lower surface of the housing, a conditioned solid discharge hole at a second portion; and a screw rotatably installed in the second housing.

* * * * *